US010866326B2

(12) United States Patent
Matsue et al.

(10) Patent No.: US 10,866,326 B2
(45) Date of Patent: Dec. 15, 2020

(54) MOVING STATE DETERMINING DEVICE, ELECTRONIC TIMEPIECE, MOVING STATE DETERMINING METHOD, AND STORAGE DEVICE

(71) Applicant: CASIO COMPUTER CO., LTD., Tokyo (JP)

(72) Inventors: Takeshi Matsue, Kokubunji (JP); Tatsuya Sekitsuka, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 162 days.

(21) Appl. No.: 16/135,079

(22) Filed: Sep. 19, 2018

(65) Prior Publication Data
US 2019/0094386 A1 Mar. 28, 2019

(30) Foreign Application Priority Data
Sep. 25, 2017 (JP) .................. 2017-183190

(51) Int. Cl.
*G01S 19/47* (2010.01)
*G01S 19/40* (2010.01)
(Continued)

(52) U.S. Cl.
CPC ............ *G01S 19/47* (2013.01); *G01C 21/165* (2013.01); *G01S 19/28* (2013.01); *G01S 19/40* (2013.01); *G01S 19/49* (2013.01); *G01S 19/52* (2013.01)

(58) Field of Classification Search
CPC .......... G01S 19/47; G01S 19/28; G01S 19/40; G01S 19/20; G01S 19/49; G01S 19/52; G01C 21/165; G01C 21/28
(Continued)

(56) References Cited

U.S. PATENT DOCUMENTS

2009/0140924 A1 6/2009 Mizuochi et al.
2013/0162468 A1* 6/2013 Kim ...................... G01S 19/33
342/357.25
(Continued)

FOREIGN PATENT DOCUMENTS

GB 2 352 348 A 1/2001
JP 2003-167043 A 6/2003

OTHER PUBLICATIONS

Extended European Search Report dated Feb. 13, 2019 received in European Patent Application No. EP 18195476.9.

*Primary Examiner* — Harry K Liu
(74) *Attorney, Agent, or Firm* — Scully Scott Murphy & Presser (57) ABSTRACT

A moving state determining device includes a receiver receiving radiowaves from a positioning satellite and a processor. The processor determines a moving state of a satellite radiowave receiving unit based on a motion state measured by a sensor which measures a motion state, and performs a positioning operation based on information received by the receiver to obtain a current position and an error range thereof. In determining the moving state, a positioning operation result obtained when the error range satisfies a predetermined accuracy standard can be used. The error range is calculated based on a positioning accuracy and a deviation of the obtained current position and a predicted position calculated in accordance with the moving state. The positioning accuracy is obtained by combining each position of positioning satellites from which radiowaves are received and each receiving state of the radiowaves.

20 Claims, 5 Drawing Sheets

(51) Int. Cl.
*G01S 19/49* (2010.01)
*G01S 19/28* (2010.01)
*G01C 21/16* (2006.01)
*G01S 19/52* (2010.01)

(58) Field of Classification Search
USPC .................................................. 342/357.3
See application file for complete search history.

(56) References Cited

U.S. PATENT DOCUMENTS

| | | | |
|---|---|---|---|
| 2013/0293412 A1* | 11/2013 | Appleford | G01S 19/41 342/357.23 |
| 2014/0129189 A1 | 5/2014 | Gyorfi | |
| 2014/0288828 A1* | 9/2014 | Werner | G01C 21/00 701/527 |
| 2015/0138015 A1* | 5/2015 | Ishigami | G01S 19/52 342/357.61 |
| 2018/0245924 A1* | 8/2018 | Ishigami | G01C 21/165 |
| 2018/0313653 A1* | 11/2018 | Sakai | G07C 5/0808 |

* cited by examiner

MOVING STATE DETERMINING DEVICE, ELECTRONIC TIMEPIECE, MOVING STATE DETERMINING METHOD, AND STORAGE DEVICE

BACKGROUND

The technical field relates to a moving state determining device, an electronic timepiece, a moving state determining method, and a storage device.

A positioning device (satellite radiowave receiving device) receives radiowaves containing positioning information from positioning satellites and performs positioning operations. The positioning device can specify current positions at various countries and regions of the world based on the current positions of a plurality of positioning satellites and gaps in propagation time (pseud distance) of radiowaves transmitted from these positioning satellites. Further, a moving history of a user can be obtained by continuous positioning operations.

The positioning device sometimes performs positioning operations with low accuracy if radiowaves are received from positioning satellites having a biased distribution due to the surrounding topography or high-rise buildings, and if the received radiowaves have been reflected on high-rise buildings etc. Depending on the usage of the positioning results, it is necessary to use positional information based on such positional accuracy, to exclude positional information of low accuracy, and the like. Japanese Unexamined Patent Application Publication No. 2003-167043 discloses techniques including comparison of positioning calculation results respectively based on different numbers of positioning satellites used for positioning, and accuracy determination using DOP (Dilution of Precision) which represents positioning accuracy according to positions of positioning satellites.

However, determining a moving state using the positioning result as it is may result in blurring of the current position obtained according to the positioning accuracy and, particularly when the accuracy is low, result in an unnatural moving state or determination of more rapid change in the moving state than it actually is.

SUMMARY

A moving state determining device, an electronic timepiece, a moving state determining method, and a storage device are disclosed.

According to a preferred embodiment, there is provided a moving state determining device including:

a receiver receiving radiowaves from a positioning satellite; and a processor, wherein the processor determines a moving state of a satellite radiowave receiving unit based on a motion state measured by a sensor which measures a motion state of the satellite radiowave receiving unit, wherein the processor performs a positioning operation based on information received by the receiver to obtain a current position and an error range of the current position, wherein a result of the positioning operation can be used in determining the moving state, the result being obtained when the error range satisfies a predetermined accuracy standard, and wherein the error range is calculated based on a positioning accuracy and on a deviation of the current position relative to a predicted position calculated according to a moving state of the satellite radiowave receiving device, the positioning accuracy being obtained by combining a position receiving state of radiowaves for each of a plurality of positioning satellites from which radiowaves are received.

DETAILED DESCRIPTION OF THE INVENTION

An embodiment will now be described with reference to the drawings.

Figure 1:
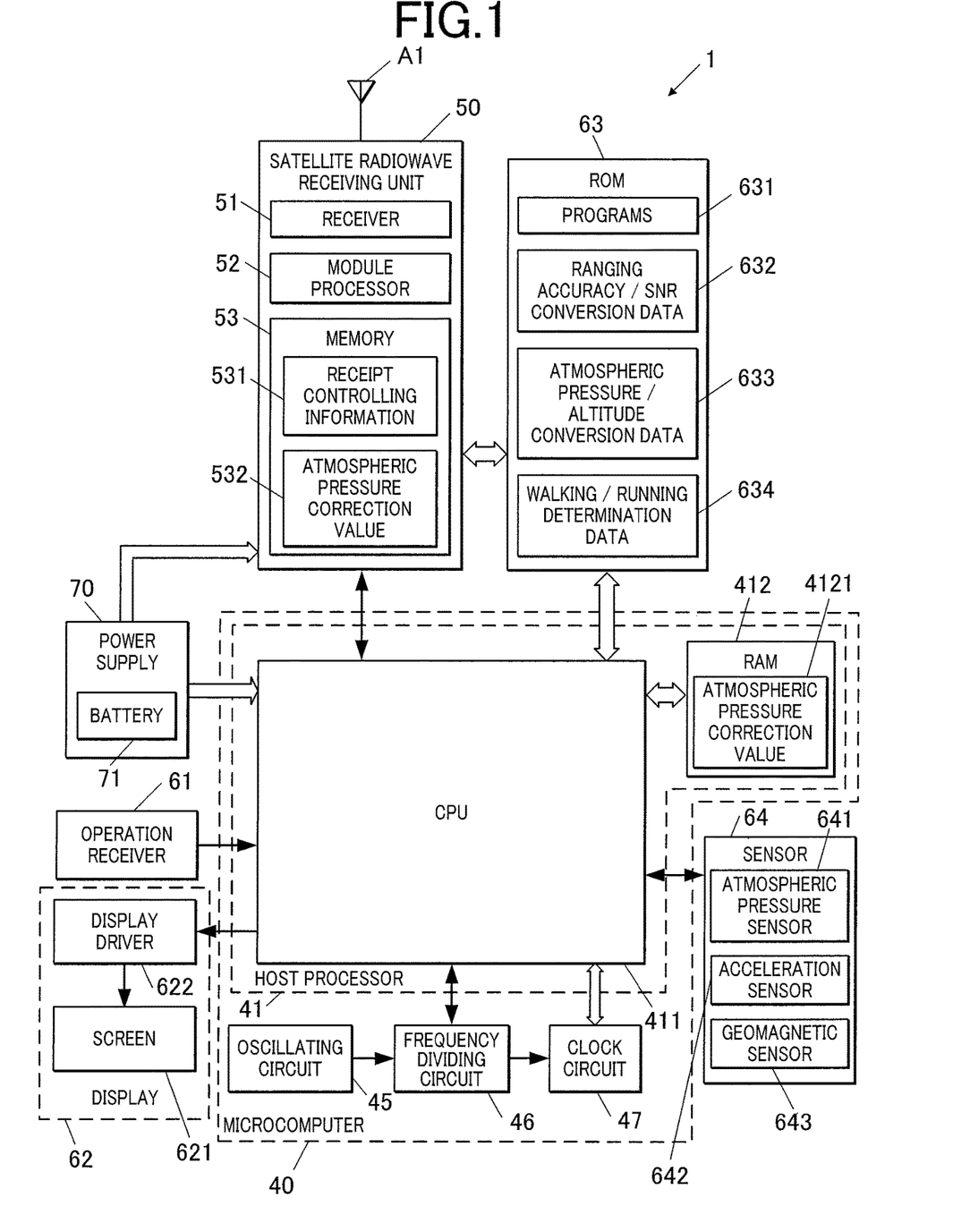
FIG. 1 is a block diagram illustrating a functional configuration of an electronic timepiece according to an embodiment of the present invention.

FIG. 1 is a block diagram illustrating a functional configuration of an electronic timepiece 1 according to an embodiment of the present invention.

An electronic timepiece 1 includes a moving state determining device according to the embodiment and is assumed to be a portable one such as a wrist watch. The electronic timepiece 1 includes a microcomputer 40, a satellite radiowave receiving unit 50, an antenna A1, an operation receiver 61, a display 62, a read only memory (ROM) 63, and a power supply 70.

The microcomputer 40 performs various operations, such as control of the electronic timepiece 1, storage in memory, and counting of date and time. The microcomputer 40 includes a host processor 41, an oscillating circuit 45, a frequency dividing circuit 46, and a clock circuit 47.

The host processor 41 administers the overall operations of the electronic timepiece 1. The host processor 41 includes a central processing unit (CPU) 411 and a random access memory (RAM) 412.

The CPU 411 performs various calculations to control a normal display of date and time and operations relevant to the various functions of the electronic timepiece 1, such as alarm notification, timer, and stop watch functions. The CPU 411 also controls display, notification, and correction of position according to the results of a positioning operation or a date and time obtaining operation performed by the satellite radiowave receiving unit 50.

The RAM 412 provides the CPU 411 with a working memory and stores temporary data. The temporary data includes information on time zone settings and local time settings (including daylight-saving time). The time zone settings are used to display the current date and time (local time) at a set position, such as the current position, in a region in the world. These local time settings may be updated in accordance with the obtained current position information. The RAM 412 may be external to the microcomputer 40. The RAM 412 may also include a rewritable non-volatile memory in addition to DRAM.

The RAM 412 stores an atmospheric pressure correction value 4121. The host processor 41 converts the atmospheric pressure value into an altitude value using the atmospheric pressure/altitude conversion data 633 using the atmospheric pressure correction value 4121 which is a value for correcting the fluctuation of the atmospheric pressure due to weather conditions or the like from reference data. That is, the atmospheric pressure correction value 4121 is updated appropriately as follows: when the atmospheric pressure (sea level pressure) is lower than the reference value due to the passage of low pressure or the like, the calculated altitude value is corrected to be lower for a certain air pressure; and when the atmospheric pressure (sea level pressure) is higher than the reference value in a high-pressure area, the calculated altitude value is corrected to be higher for a certain air pressure.

The oscillating circuit 45 generates and outputs a signal with a predetermined frequency of, for example, 32.768 kHz (clock signal). A crystal oscillator, for example, is used to generate clock signals. The crystal oscillator may be external to the microcomputer 40. The frequency of the clock signals output from the oscillating circuit 45 may contain offset errors within an allowable range for the electronic timepiece 1. The frequency of the clock signals varies, depending on an external environment, primarily temperatures.

The frequency dividing circuit 46 frequency-divides the clock signals input from the oscillating circuit 45 into frequency-division signals with a predetermined frequency division ratio, and outputs the frequency-division signals. The frequency division ratio may be varied by the CPU 411.

The clock circuit 47 counts signals with a predetermined frequency input from the frequency dividing circuit 46, which may be identical to that of the clock signals, to count and retain the current date and time. The accuracy of the date and time counted by the clock circuit 47 depends on the accuracy of the clock signals from the oscillating circuit 45, i.e., the above-mentioned offset errors and the degree of variations in the frequency of the clock signals. The date and time counted by the timing circuit 47 may deviate from an accurate date and time. The CPU 411 can modify the counted date and time based on the current date and time obtained by the satellite radiowave receiving unit 50.

The satellite radiowave receiving unit 50 can receive radiowaves transmitted from a positioning satellite in various global navigation satellite systems (GNSS), such as Global Positioning System (GPS) of the U.S.A. The satellite radiowave receiving unit 50 processes the received radiowaves to obtain information on the current date and time and the current position. In response to a request of the host processor 41 (CPU 411), the satellite radiowave receiving unit 50 outputs requested information in a predetermined format to the host processor 41. The satellite radiowave receiving unit 50 includes a receiver 51, a module processor 52, and a memory 53.

The receiver 51 receives radiowaves transmitted from a target positioning satellite. In the receiving operation, the receiver 51 acquires (detects) the radiowaves transmitted from the positioning satellite and identifies the positioning satellite and the phase of signals in the transmitted radiowaves (a navigation message). The receiver 51 tracks the radiowaves transmitted from the positioning satellite based on the identification information on the acquired positioning satellite and the phase, and continuously demodulate and receive the signals.

The module processor 52 includes a CPU and a RAM and controls the various operations of the satellite radiowave receiving unit 50. In response to an instruction of the host processor 41, the module processor 52 causes the receiver 51 to receive radiowaves from a positioning satellite at an appropriate timing, obtains necessary information from the received radiowaves, and performs various calculations for positioning to obtain the current date and time and the current position of the electronic timepiece 1 (the satellite radiowave receiving unit). The module processor 52 may be provided with a dedicated hardware circuit for various calculations. The results of the positioning may be output in a common format, such as NMEA-0183 (National Marine Electronics Association), or in a format specific to the electronic timepiece 1. The data output by the hardware circuit in a predetermined format may be processed as needed and output by the CPU. The RAM is provided on a substrate of a control chip of the module processor 52. Alternatively, the RAM may be external to the control chip. The output results include at least current date and time, three components of the current position of the satellite radiowave receiving unit 50, three components of the moving velocity of the satellite radiowave receiving unit 50, and a determination result and/or a result regarding error estimation.

The memory 53 stores receipt controlling information 531, such as various parameters and received information, control programs executed by the module processor 52 in the satellite radiowave receiving unit 50, and results of a positioning operation (moving history or moving state). Examples of the parameters include format data for navigation messages from each positioning satellite and the atmospheric pressure correction value 532 described above. The atmospheric pressure correction value 532 is used when the module processor 52 converts the atmospheric pressure into altitude. The received information includes, for example, predicted orbit information (almanac) and precise orbit information (ephemeris), which are obtained from each positioning satellite. The memory 53 is a non-volatile memory and may be external to a control chip (a substrate) of the module processor 52.

Here, the atmospheric pressure correction value 4121 and the atmospheric pressure correction value 532 are respectively stored, corresponding to cases where the host processor 41 performs various processes involving conversion from atmospheric pressure to altitude and where the module processor 52 performs various processes involving conversion from atmospheric pressure to altitude. In the following description, only the case where the module processor 52 performs various processes involving this conversion will be described. When one of the atmospheric pressure correction values 4121 and 532 is updated, the other is also updated. In the case where various processes involving this conversion are performed only by one of the processors, the atmospheric pressure correction value may not be stored in the RAM 412 and the memory 53 which are referred to by the processor not performing the various processes.

The operation receiver 61 receives external input operations, such as a user operation. The operation receiver 61 includes a push-button switch and a winding crown. In response to a pressing operation of the push-button switch or a pulling-out, rotating, or pushing-back operation of the winding crown, the operation receiver 61 outputs a corresponding operational signal to the host processor 41. Alternatively, the operation receiver 61 may include a touch sensor.

The display 62 shows various pieces of information in accordance with the control of the host processor 41. The display 62 includes a display driver 622 and a screen 621. The screen 621 displays digital information on a liquid crystal display (LCD) of a segment, dot-matrix or combination type. Alternatively, the display 62 may be configured to show information with needles and a stepping motor that rotates the needles, instead of the digital display on the display screen 621. In response to a control signal from the CPU 411, the display driver 622 outputs a drive signal on the display screen 621 to show information on the display screen 621. The information appearing on the display 62 includes the date and time information (in particular, the current date and time) according to the date and time counted by the clock circuit 47, and date and time settings, set time, and measured time for the alarm notification, timer and stop watch functions. Information on the current position obtained through a positioning operation and local time settings can also be displayed.

The ROM 63 stores programs 631 and initial setting data. The programs 631 are for the host processor 41 and the module processor 52 to perform control operations. The ROM 63 may store a non-volatile memory, such as a rewritable and updatable flash memory, in addition to or in place of a mask ROM. The ROM 63 is accessible (readable and writeable if it is a nonvolatile memory) by the host processor 41 and the module processor 52 and may be detachable from a mount portion, such as a slot.

The program 631 includes a control program regarding operations for obtaining current date and time, for measuring position (positioning operation), and for determining (judgement) the moving state. The ROM 63 stores ranging accuracy/SNR conversion data 632, atmospheric pressure/altitude conversion data 633, walking/running determination data 634, and the like as setting data. The ranging accuracy/SNR conversion data 632 indicates a correspondence relation between the strength of radiowaves received by the satellite radiowave receiving unit 50 and the ranging accuracy corresponding to the strength of received radiowaves, that is, the measurement accuracy of the distance between the positioning satellite and the electronic timepiece 1 (the satellite radiowave receiving unit 50). The ranging accuracy/SNR conversion data 632 may be table data in which values of ranging accuracy are respectively associated with a plurality of SNRs, or may be a formula (including an approximation formula) to calculate ranging accuracy from SNR. The various setting data may be stored in the memory 53 of the satellite radiowave receiving unit 50.

The atmospheric pressure/altitude conversion data 633 is data serving as a reference for converting the measured atmospheric pressure value into an altitude value. Normally, in this data, the atmospheric pressure at sea level (altitude is zero) is set to 1013.0 hPa or 1013.25 hPa as the reference atmospheric pressure, and as the altitude increases, the atmospheric pressure decreases. The atmospheric pressure/altitude conversion data 633 may be table data for storing altitude values respectively corresponding to a plurality of atmospheric pressures, or may be a formula for conversion. In the case of table data, the altitude value corresponding to the atmospheric pressure value between the stored atmospheric pressure values may be obtained by linear interpolation.

The walking/running determination data 634 is data for determination based on the waveform pattern of the measurement data of acceleration when the user of the electronic timepiece 1 (satellite radiowave receiving unit) moves by walking or running. When the user moves by walking or running, specific acceleration changes occur corresponding to the motion of legs in the vertical direction and the moving direction. When the electronic timepiece 1 is a wristwatch, the acceleration corresponding to the swing of the arm on which the wristwatch is worn is further added. In the walking/running determination data 634, the determination conditions of such pattern data are stored and referred to when the moving state is determined. It should be noted that the walking/running determination data 634 may be incorporated in the program 631.

The sensor 64 measures various physical quantities with a sensor and outputs measured values and determination data based on the measurement result to the host processor 41. Here, the sensor 64 includes an atmospheric pressure sensor 641, an acceleration sensor 642, a geomagnetic sensor 643, and the like. The atmospheric pressure sensor 641 measures atmospheric pressure and outputs measured values to the host processor 41. The acceleration sensor 642 measures acceleration in three axial directions and outputs them to the host processor 41. The geomagnetic sensor 643 measures the magnetic field in three axial directions and outputs them to the host processor 41. The measured magnetic field is mainly the earth's magnetic field, but if the magnetic field is generated locally, this local magnetic field is superimposed on the earth's magnetic field. The sensors of the sensor 64 can measure the motion state of the electronic timepiece 1 (the satellite radiowave receiving unit or the user) alone, in combination, or based on the change of measured data with time.

The power supply 70 supplies power from a battery 71 to various units of the electronic timepiece 1, such as microcomputer 40 and the satellite radiowave receiving unit 50, at a predetermined drive voltage. The supply or non-supply of power to the satellite radiowave receiving unit 50 can be controlled separately from power supply to the microcomputer 40 under the control of the host processor 41. The battery 71 is a replaceable dry-cell battery or a rechargeable battery. The power supply 70 and may include solar panels and an electricity charging (storing) unit as the battery 71.

The moving state determining operation of the electronic timepiece 1 according to this embodiment will now be described.

In the electronic timepiece 1, the movement state of the electronic timepiece 1 (user) is determined based on the physical quantity measured by the sensor (s) of the sensor 64 at predetermined time intervals, here, every one second. The module processor 52 of the satellite radiowave receiving unit 50 obtains the atmospheric pressure value from the atmospheric pressure sensor 641 of the sensor 64 via the host processor 41 and converts the atmospheric pressure value into altitude value in reference to the atmospheric pressure/altitude conversion data 633 and the atmospheric pressure correction value 532. The module processor 52 obtains a fluctuation pattern of acceleration from the acceleration sensor 642 via the host processor 41, and determines whether or not the movement occurs and, if movement occurs, whether the movement is caused by walking or running.

Further, the module processor 52 can estimate the moving direction and the moving velocity of the electronic timepiece 1 based on the relationship between the direction of acceleration generated from the acceleration sensor 642 and the direction of the magnetic pole obtained from the geomagnetic sensor 643, the change in altitude over time described above, and the like.

Meanwhile, the satellite radiowave receiving unit 50 of the electronic timepiece 1 receives radiowaves from a plurality of (four or more) positioning satellites to acquire navigation messages. The electronic timepiece 1 performs positioning calculations based on the received navigation messages and the timing to receive the navigation messages.

In the case of continuous repeated positioning operations, positioning results are obtained once in a predetermined period, for example, once a second in accordance with the timing at which the moving direction and the moving velocity are identified by the module processor 52 as described above. As a result, a three-dimensional position is acquired every second. The electronic timepiece 1 acquires the results of the positioning operation every second. In the positioning calculations, the electronic timepiece 1 calculates the accuracy of results of the positioning operation, i.e., an error range of the current position.

A navigation message received from each of four or more positioning satellites contains an ephemeris. In the positioning calculations, as is commonly known, the current position of each satellite based on the ephemeris and a difference in the timing to receive the navigation message from each positioning satellite (pseudo range) are used to acquire four unknowns, i.e., three components of the current position of electronic timepiece 1 and a component of the current time and date. This calculation is performed by an iterative calculation (successive approximation), for example, the Newton-Raphson method (Newton's method). The iterative calculation involves a numerical convergence of a predetermined initial value to an unknown value.

In the calculation of the accuracy of the results of positioning, an error range is calculated by each of two methods for calculating the accuracy described below in consideration of a deviation between the current position and a predicted position, and a more appropriate error range is selected from these two calculated error ranges. The "more appropriate" indicates simply a larger error range, i.e., a lower accuracy, to cover the largest error range that can be expected. The above-mentioned predicted position is acquired based on a positional relation among a plurality of positioning satellites from which radiowaves are received, the state of radiowaves received from each positioning satellite, and the moving state (moving velocity) of the electronic timepiece 1 (the satellite radiowave receiving device).

Figure 2:
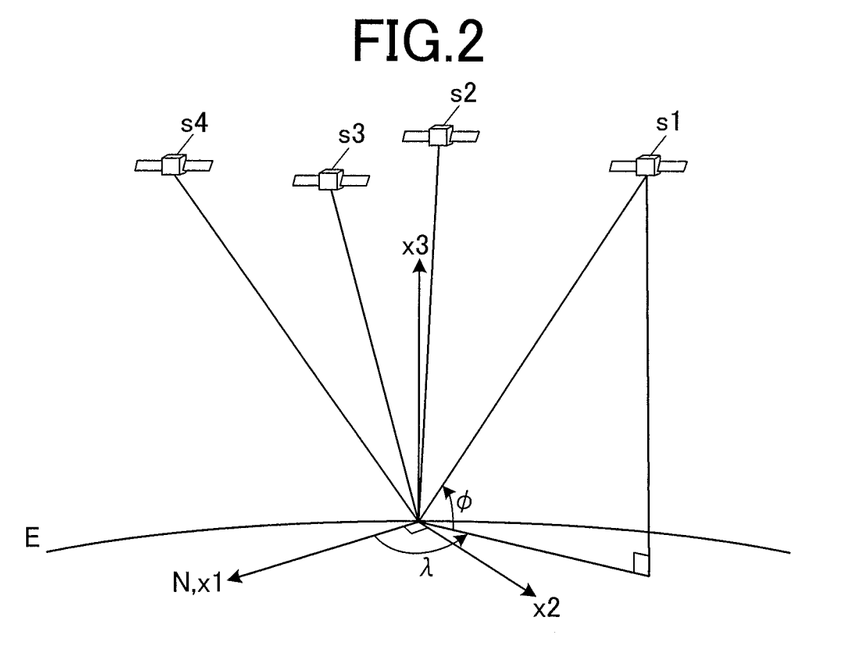
FIG. 2 illustrates a first method for calculating positioning accuracy.

FIG. 2 illustrates a first method for calculating positioning accuracy of the electronic timepiece 1 according to this embodiment.

In the first method for calculating positioning accuracy, a first error range is calculated based on the state of radiowaves received from positioning satellites. For a positioning satellite from which radiowaves can be received, its relative direction to the current position is determined with an elevation angle $\Phi$ and an azimuth angle $\lambda$. The elevation angle $\Phi$ is an angle between the line connecting the current position and the positioning satellite and a horizontal plane E; a direction $x_3$ is perpendicular to the horizontal plane E. The azimuth angle $\lambda$ is an angle between the component on the horizontal plane E of the line connecting the current position and the positioning satellite and the north pole direction N; the north pole direction N is defined by the direction $x_1$ and the direction perpendicular to the direction $x_1$ on the horizontal plane E is defined by a direction $x_2$. A more appropriate distribution of a plurality of positioning satellites from which radiowaves are received results in the acquisition of more accurate three components of the current position and a more accurate time component. In other words, an uneven distribution of a plurality of positioning satellites with respect to the current position results in a lower positioning accuracy.

The dilution of precision (DOP) used to evaluate a positioning accuracy is represented by $D=A^T \cdot A$ on a matrix A (x) of n rows and 4 columns that consists of three directional components ($x_{ij}$, j=1 to 3) relative to the current position of each positioning satellite $s_i$ (i=1 to n, n represents the number of positioning satellites used for positioning) and a time component ($x_{i4}$, $x_{i4}$=1), i.e., the diagonal component of the inverse matrix $D^{-1}=U$ of the matrix D of four rows and four columns having j and k components which are expressed with $D_{jk}=\Sigma_{(i=1-n)}(x_{ij} \cdot x_{ik})$. This indicates that DOP solely depends on the position of each positioning satellite $s_i$. These three directional components having a vector length of 1 can be calculated with ($x_{i1}$, $x_{i2}$, $x_{i3}$)=(cos $\lambda_i \cdot$cos $\Phi_i$, sin $\lambda_i \cdot$cos $\Phi_i$, sin $\Phi_i$). HDOP, a horizontal DOP, is expressed by $(|u_{11}|+|u_{22}|)^{1/2}$ using diagonal components $u_{ii}$ of the matrix U; VDOP, a vertical DOP, is expressed by $(|u_{33}|)^{1/2}$; PDOP, a positional DOP, is expressed by $(\Sigma_{(i=1\ to\ 3)}|u_{ii}|)^{1/2}$. These DOP values are approximately 1 under the best conditions; greater values indicate a lower accuracy.

However, in fact, the distribution of the positioning satellites with lower DOP values increases a difference in angle among the positioning satellites viewed from the current position, which normally results in inclusion of a positioning satellite having a small elevation angle $\Phi_i$. Meanwhile, smaller elevation angle $\Phi_i$ tends to result in reduced strength of the received radiowaves. The first method for calculating positioning accuracy of the electronic timepiece 1 according to this embodiment involves weighting of a variance in relative position of each positioning satellite with the corresponding SNR based on a combination of the position of each positioning satellite (a relative position with respect to the current position) and the ranging accuracy corresponding to the strength of received radiowaves from the each positioning satellite.

Figure 3:
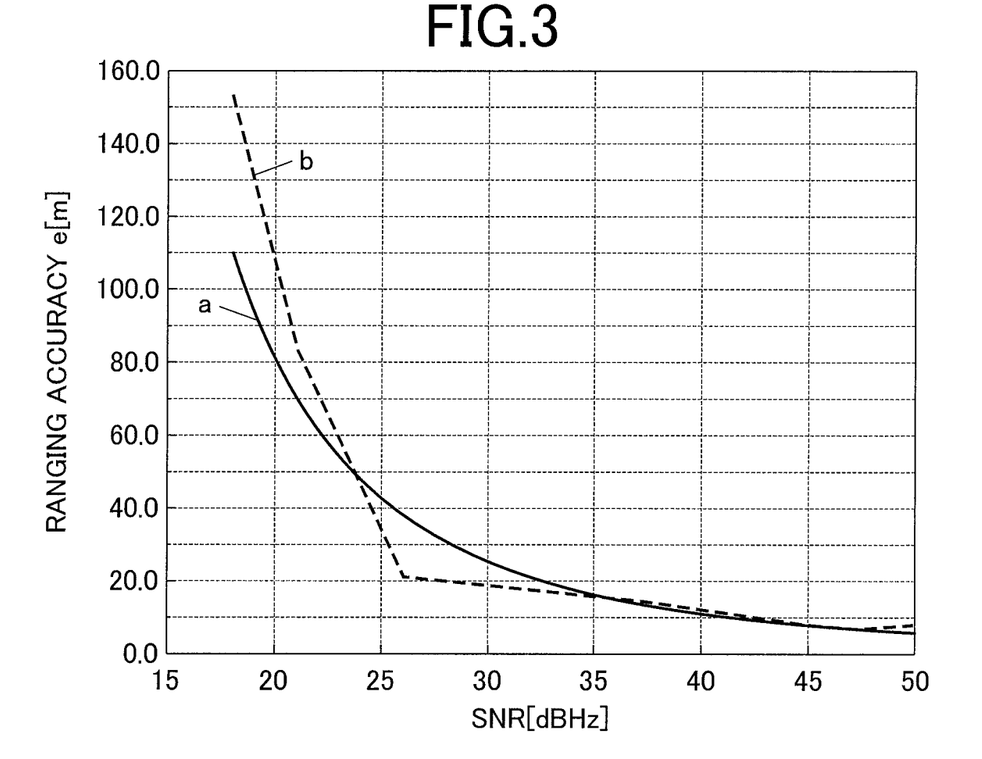
FIG. 3 illustrates a relation between a signal-to-noise ratio (SNR) of radiowaves received from a positioning satellite and a ranging accuracy for the positioning satellite from which radiowaves are received at the SNR.

FIG. 3 illustrates a relation between a SNR of radiowaves received from a positioning satellite and a ranging accuracy for the positioning satellite from which radiowaves are received at the SNR.

As a SNR reduces, the accuracy for determining a pseudo range (a ranging accuracy $e_i$ [km]) also deteriorates (the value increases), i.e., the maximum deviation expected at a position acquired through positioning increases. As shown by the solid line (a) in FIG. 3, the ranging accuracy $e_i$ improves (its value decreases) in accordance with an exponential function, as the SNR increases. This relation is stored as the ranging accuracy/SNR conversion data 632 in the ROM 63 before shipment of the product in the form of table data acquired based on measurements (or examination) or a calculating formula. In the case where the ranging accuracy/SNR conversion data 632 is in the form of table data, the ranging accuracy $e_i$ corresponding to the intermediate value among the SNR values in the table may be calculated through interpolation. In the case where the ranging accuracy/SNR conversion data 632 in the form of calculating formula, the calculating formula may be an approximation formula provided that required accuracy is retained. The calculating formula may be simply expressed by a combination of several straight lines, for example, as shown by the broken line (b) in FIG. 3.

As described above, radiowaves are received from a plurality of positioning satellites to perform positioning operations. A combination of SNRs or ranging accuracies $e_i$ of positioning satellites causes a variation in the maximum deviation that may be included in the final results of the positioning operation. Here, the first error range is calculated as follows: Each element ($x_{ij} \cdot x_{ik}$) of each component $D_{jk}=\Sigma_{(i=1\ to\ n)}(x_{ij} \cdot x_{ik})$ of the matrix D is weighted with the ranging accuracy $e_i$ corresponding to the SNR for each positioning satellite $s_i$, i.e., with $e_i^{-2}$. Using the weighting matrix W of n rows and n columns having diagonal components $sw_{ii}$ set to $e_i^{-2}$ ($w_{ii}=e_i^{-2}$) and having all non-diagonal components set to "0", the positioning accuracy weighted with a receiving strength by the inverse matrix $D^{-1}=U$ of the matrix $D=A^T \cdot W \cdot A$ (each component $D_{jk}=\Sigma_{(i=1\ to\ n)}(x_{ij} \cdot w_{ii} \cdot x_{ik})$) is calculated as a first estimated deviation $\Delta x$ (a first error range). As descried above, the DOP values under the best conditions are approximately 1. The first estimated deviation $\Delta x$ is in the same order as that of the square root of the square of a ranging accuracy $e_i$, i.e., the same order as that of the ranging accuracy $e_i$. Alternatively, the first estimated deviation $\Delta x$ may be suitably multiplied by a predetermined factor.

As described above, the first estimated deviation $\Delta x$ calculated by the first method for calculating positioning accuracy is acquired directly from the receiving strength and the distribution of positioning satellites.

Figure 4:
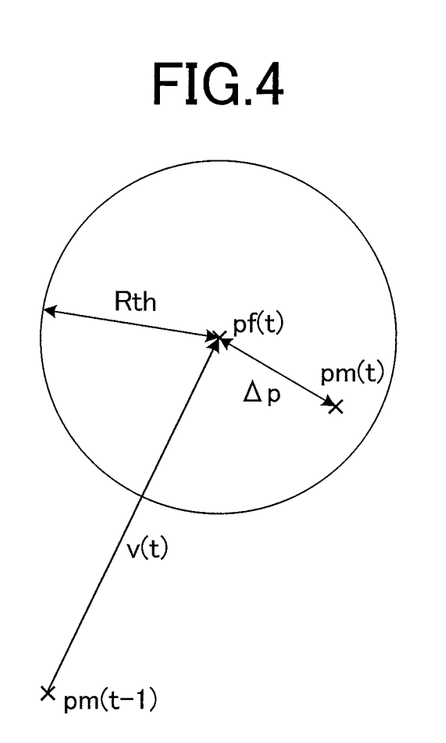
FIG. 4 illustrates a second method for calculating positioning accuracy.

FIG. 4 illustrates a second method for calculating positioning accuracy of the electronic timepiece 1 according to this embodiment.

In the second method for calculating positioning accuracy, a second error range is determined based on a deviation between a predicted position and the current position.

After several (at least two) acquisitions of positional information, the moving velocity of the electronic timepiece 1 (the satellite radiowave receiving device) can be calculated based on the changes of positions. In the case where no large acceleration is generated, the next calculated position reached after moving from the last position (calculated position) at this moving velocity can be predicted. Comparison of this predicted position with the next calculated position can acquire a deviation in the result of the positioning operation. Let a predicted velocity vf(t) be equal to the last measured velocity vm (t−1). The last measured velocity vm (t−1) is obtained by dividing a difference between calculated positions pm(t−1) and pm(t−2), which are the calculated results of the last two positioning operations, by a difference $\Delta t$ in time between the last two positioning operations. The predicted velocity vf(t) can be calculated as follows: vf(t)=vm(t−1)=(pm(t−1)−pm(t−2))$\Delta t$.

The predicted velocity vf(t), which is acquired as shown above, is used to obtain a predicted position pf(t) as follows: pf(t)=pm(t−1)+vf(t)·$\Delta t$. The deviation between the predicted position pf(t) and the calculated position pm(t) represents a second estimated deviation $\Delta p$ (second error range), which is calculated as follows: $\Delta p=|pf(t)-pm(t)|$.

Instead of calculation of a predicted position pf(t) using the last calculated position pm(t−1), a more likely presumed position pe(t−1) may be obtained using the calculated position pm(t−1) and the last predicted position pf(t−1) to calculate a predicted position pf(t) as follows: pf(t)=pe(t−1)+vf(t)·$\Delta t$. The presumed position pe(t−1) may be obtained by an appropriate means, for example, Kalman filter. Even if the Kalman filter is not used, the presumed position pe(t) can be obtained by weighing the predicted position and the calculated position properly in accordance with the deviation therebetween, like Kalman filter's error covariance matrix.

Alternatively, in the calculation of the predicted position pf(t), acceleration may be considered based on a difference between velocities. Alternatively, if a moving velocity in the direction of the line connecting a positioning satellite and the electronic timepiece can be measured as a variation in frequency due to the Doppler effect based on the positional relation between the positioning satellite and the electronic timepiece, the moving velocity may be calculated based on the variation in frequency. Alternatively, not only the last two (or three, if acceleration is generated) calculated positions but also the historical information of positions may be statistically processed to find a moving tendency.

In the second method for calculating positioning accuracy, deviation between the current position predicted based on velocities and their history and the actually calculated position and the impact of the deviation may be considered.

Subsequently, the moving state determining operation according to this embodiment will now be described.

The electronic timepiece 1 according to the present embodiment determines (direction and velocity of) the entire movement operation of the electronic timepiece 1 and a motion state including a periodic or random motion accompanying the entire movement based on the measurement data by the acceleration sensor 642. The movement state is judged on the basis of the motion state. The moving state includes a static state and a stopped state with motion but without movement (collectively referred to as a static/stopped state), a moving state by walking or running, and a moving state by vehicle such as bicycle, car, or train.

A walking or running state (collectively referred to as a moving state on foot) can be determined based on measurement of a conventionally-known periodic acceleration variation pattern. Transition to a moving state by vehicle can be determined based on continuous acceleration of velocity in the accelerating direction. Transition to the static/stopped state can be determined based on temporary acceleration in a direction opposite to the moving direction measured with the geomagnetic sensor 643 in advance at the time of positioning or acceleration, followed by all acceleration components being zero. If the velocity during movement is obtained in advance, it may be determined whether the acceleration results in reduction in velocity.

In the electronic timepiece 1 of the present embodiment, the change in the motion state is determined on the basis of the positioning accuracy obtained by positioning operation. It may be difficult to detect transition between a moving state and a static/stopped state only by measuring acceleration with the acceleration sensor 642, in the case of low-velocity movement or gentle acceleration/deceleration by vehicle, or in the case where the acceleration changes only in a very short time by a bicycle etc. Therefore, even if acceleration is not detected, the presence or absence of a moving state by vehicle can be determined in the electronic timepiece 1 by the positioning operation based on presence or absence of continuous detection of movement (the change of the current position) at a predetermined distance or more.

However, in the positioning operation using radiowaves from positioning satellites, the positioning results often fluctuate due to changes in the surrounding environment, coordination by movement of positioning satellites, strength received from positioning satellites, and the like. If such positioning results are used as it is, it may be determined that the user is moving, although the electronic timepiece 1 (user) is not moving. Therefore, in the electronic timepiece 1, the positioning result can be used only when the accuracy satisfies a predetermined accuracy standard. This prevents unnecessarily switching between a moving state (in particular, a moving state of a user not by walking or running but by vehicle) and a static/stopped state.

Figure 5:
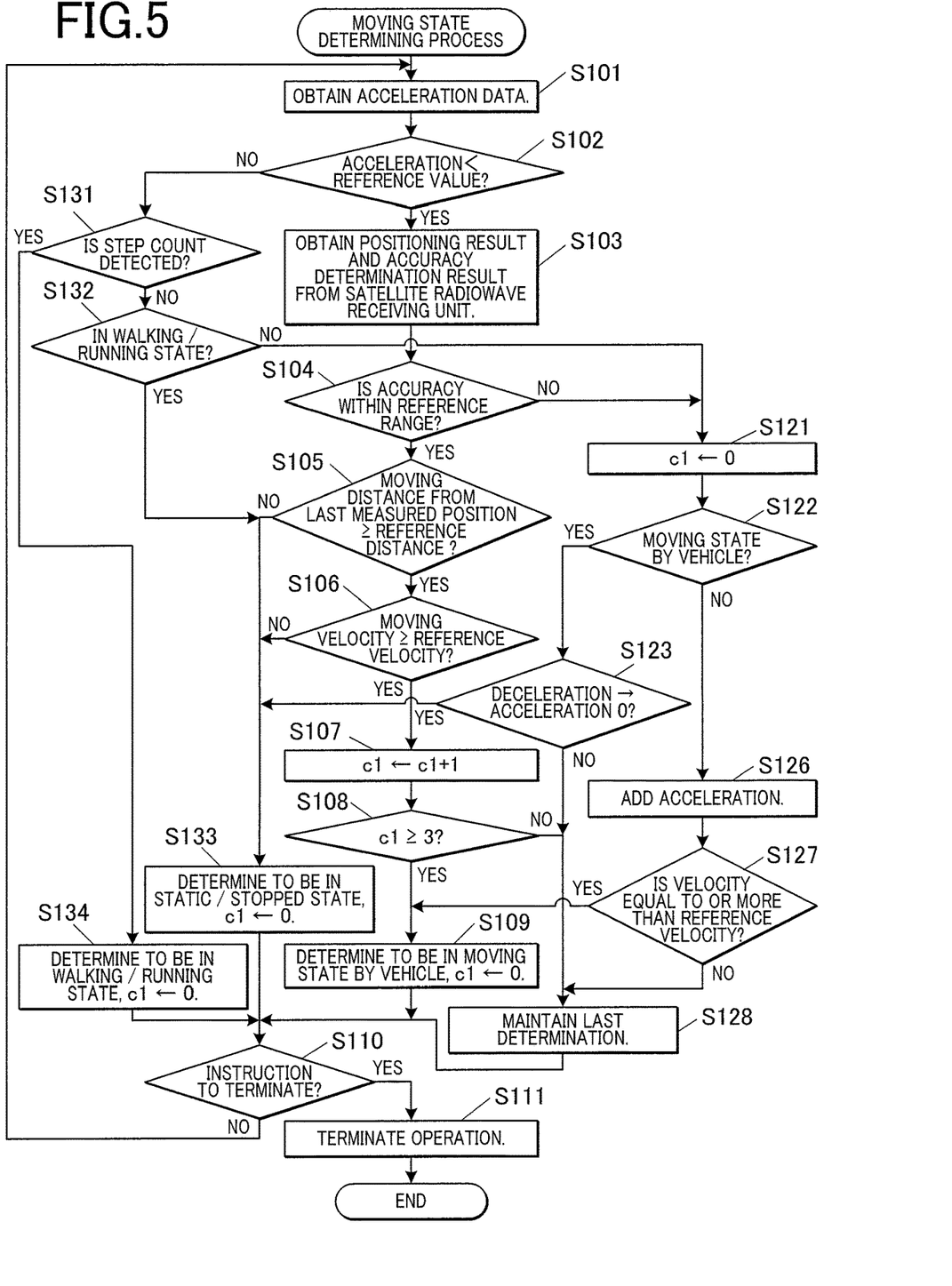
FIG. 5 illustrates a procedure of controlling moving state determination process.

FIG. 5 is a flowchart illustrating a control procedure performed by the host processor 41 for performing moving state determination process in the electronic timepiece 1 according to the present embodiment.

The moving state determination process constitutes a discrimination step (discrimination means in the program) in the embodiment of the moving state determining method according to the present invention. The moving state determination process starts when the host processor 41 outputs a command to the module processor 52 when the host processor 41 detects that the operation receiver 61 has received a predetermined input, or when the moving state determination process is called from another program which requires detection of a moving state. This moving state determination process is performed in parallel with continuous positioning operations by the satellite radio wave receiving unit 50. When the positioning operation is not executed at the start of the moving state determination process, the module processor 52 activates the receiver 51 to start the positioning operation.

When the moving state determination process is started, the module processor 52 (CPU) obtains acceleration data in a unit of time (for example, in one second) measured by the acceleration sensor 642 via the host processor 41 (step S101). The module processor 52 obtains a representative value of the acceleration in the acceleration data, for example, the maximum value of the absolute value, and determines whether the representative value is less than a reference value used as a standard of walking/running state (Step S102).

If it is determined that the acceleration is not less than the reference value (equal to or more than the reference value) ("NO" in step S102), the module processor 52 determines whether or not one or more steps regarding walking/running operations are detected based on the acceleration variation pattern. In other words, it is determined whether or not one or more cycles of the acceleration fluctuation pattern corresponding to a walking (or running) pattern has been detected (step S131). If it is determined that detection has been made ("YES" in step S131), the module processor 52 initializes the count value c1 to "zero" and determines that the current motion state is the walking/running state (step S134). Then, the process of the module processor 52 proceeds to step S110.

If it is determined that one or more steps regarding walking/running operations are not detected ("NO" in step S131), the module processor 52 determines whether or not the current motion state (i.e., the last determination state) is a walking/running state (Step S132). If it is determined that the current moving state is a walking/running state ("YES" in step S132), the module processor 52 initializes the count value c1 to "zero", and determines that the moving state is a static/stopped state (step S133). Then, the process of the module processor 52 proceeds to step S110. If it is determined that the current moving state is not a walking/running state ("NO" in step S132), the process of the module processor 52 proceeds to step S121.

If it is determined that the representative value of the acceleration is less than the reference value ("YES" in step S102), the module processor 52 obtains a positioning result and an accuracy determination result regarding the positioning result (step S103). The module processor 52 determines whether or not the obtained accuracy is within a reference range (step S104). If it is determined that the obtained accuracy is not within the reference range ("NO" in step S104), the process of the module processor 52 proceeds to step S121.

When the process proceeds to step S121, the module processor 52 initializes the count value c1 to "zero" (step S121). The module processor 52 determines whether or not the current motion state (i.e., the last determination) is a moving state by vehicle (step S122). If it is determined that the moving state is not a moving state by vehicle ("NO" in step S122), the module processor 52 adds the obtained acceleration (step S126). The module processor 52 determines whether or not the velocity calculated from the added accelerations is equal to or greater than a reference value (step S127). If it is determined that the velocity is equal to or greater than the reference value ("YES" in step S127), the process by the module processor 52 proceeds to step S109. If it is determined that the velocity is not equal to or greater than the reference value ("NO" in step S127), the module processor 52 retains the last determination (step S128). Then, the process by the module processor 52 proceeds to step S110.

If it is determined in the determination process in step S122 that the current motion state is a moving state by vehicle ("YES" in step S122), the module processor 52 determines whether the direction of the obtained acceleration is opposite to the velocity (further, it may be determined whether the total of the accelerations cancels the known velocity, as described above), and whether the added acceleration in all direction is zero (step S123). If it is determined that the acceleration has changed in this way ("YES" in step S123), the process by the module processor 52 proceeds to step S133. If it is determined that the acceleration has not changed in this way ("NO" in step S123), the process by the module processor 52 proceeds to step S128.

If it is determined in the determination process of step S104 that the obtained accuracy is within the reference range ("YES" in step S104), the module processor 52 determines whether or not the moving distance from the calculated position in the last positioning operation is equal to or greater than a reference distance (step S105). If it is determined that the moving distance is not equal to or greater than a reference distance ("NO" in step S105), the process by the module processor 52 proceeds to step S133.

If it is determined that the moving distance is equal to or greater than the reference distance ("YES" in step S105), the module processor 52 determines whether or not the moving velocity of the current position calculated by the satellite radiowave receiving unit 50 is equal to or more than a predetermined reference velocity (step S106). If the velocity obtained in step S106 is substantially the same as the velocity obtained in step S105, the process in step S106 is not needed. Besides from the positioning results, the satellite radiowave receiving unit 50 may calculate the moving velocity of the current position using a Doppler shift or the like of the receiving frequency. Also in this case, the process in step S106 may be omitted and the process can proceed to step S107, in the case where the moving velocity of the current position cannot be obtained with sufficient accuracy due to the relative moving direction between the positioning satellite and the current position. If it is determined that the moving velocity is not equal to or more than the predetermined reference velocity ("NO" in step S106), the process by the module processor 52 proceeds to step S133.

If it is determined that the moving velocity is equal to or more than the predetermined reference velocity ("YES" in step S106), the module processor 52 adds "one" to the count value c1 (step S107). The module processor 52 determines whether or not the count value c1 is equal to or greater than three (that is, whether or not change in current position is detected for three seconds (a predetermined reference period) or more before the process in step S107) (step S108). If it is determined that the count value c1 is not equal to or greater than three ("NO" in step S108), the process by the module processor 52 proceeds to step S128. If it is determined that the count value c1 is equal to or greater than three ("YES" in step S108), the module processor 52 initializes the count value c1 to "zero", and determines that the current moving state is a moving state by vehicle (step S109). The process by the module processor 52 then proceeds to step S110.

That is, in order to transit (change) from the static/stopped state (current moving state) to the moving state by vehicle, a situation different from the moving state assumed in the static/stopped state, that is, a situation where it is detected that the current position has moved beyond the reference distance, continues for three seconds (the reference period) or more.

At step S110 after steps S109, S128, S133, or S134, the module processor 52 determines whether or not an instruction has been obtained to terminate the moving state determination process (step S110). The host processor 41 generates the termination instruction if a predetermined input is detected in the operation receiving unit 61, the supplied voltage by the power supply 70 falls below a predetermined reference voltage (i.e., the battery is about to run down), and the like. If it is determined that the termination instruction has not been obtained ("NO" in step S110), the process by the module processor 52 returns to step S101 so that acceleration data is obtained for the next one second. If it is determined that the termination instruction has been obtained ("YES" in step S110), the module processor 52 performs various operations for terminating the moving state determination (step S111) and terminates the moving state determination process.

Figure 6:
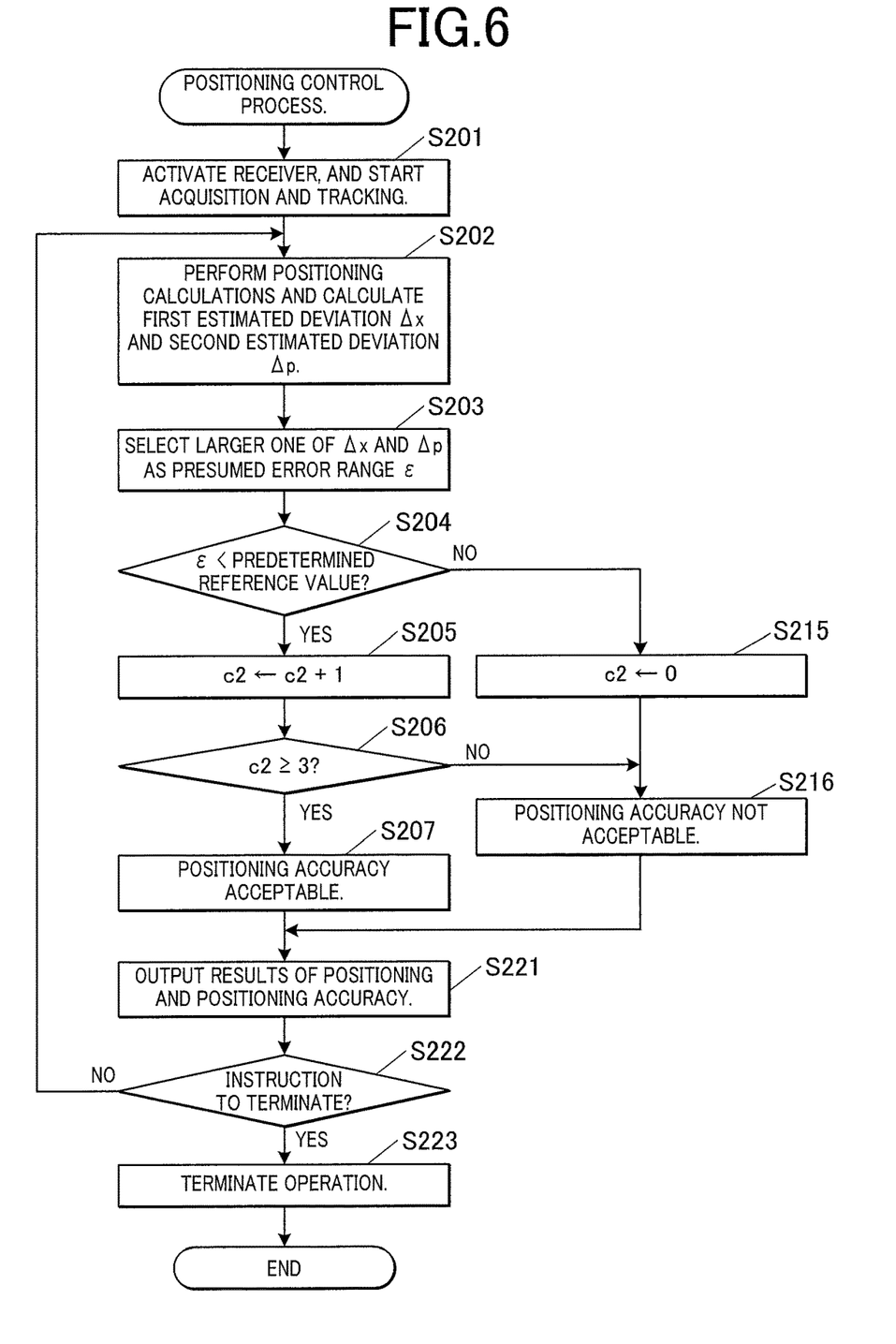
FIG. 6 illustrates a procedure of controlling positioning process.

FIG. 6 is a flowchart illustrating a controlling procedure performed by the module processor 52 for positioning control process executed in the electronic timepiece 1 according to this embodiment.

As described above, the satellite radiowave receiving unit 50 continues the positioning operation during the moving state determination process. The satellite radiowave receiving unit 50 calls and starts the positioning control process, if it is not executed at the time of starting the moving state determination process. The positioning control process can be started separately from the moving state determination process in response to a predetermined input or the like received by the operation receiving unit 61. This positioning control process constitutes a positioning step (positioning means in the program) in the moving state determining method according to the embodiment of the present invention.

At the start of the positioning control process, the module processor 52 (CPU) activates the receiver 51 so that the receiver 51 starts an acquiring operation of radiowaves from positioning satellites and sequentially tracking operation of the acquired radiowaves (Step S201). The module processor 52 performs positioning calculation based on the signal of navigation messages obtained from the tracked radiowaves and calculates the first estimated deviation $\Delta x$ and the second estimated deviation $\Delta p$ described above (step S202).

The module processor 52 selects a larger one of the first estimated deviation $\Delta x$ and the second estimated deviation $\Delta p$, as a presumed error range $\varepsilon$ (step S203). The module processor 52 determines whether or not the presumed error range $\varepsilon$ is less than a predetermined reference Rth (step S204). If it is determined that the presumed error range $\varepsilon$ is less than the predetermined reference Rth ("YES" in step S204), the module processor 52 adds one to a count C2 (step S205). The module processor 52 determines whether or not the count c2 is equal to or greater than three (step S206). If it is determined that the count c2 is equal to or greater than three ("YES" in step S206), the module processor 52 determines that the positioning accuracy is acceptable (step S207). Subsequently, the process by the module processor 52 proceeds to step S221. If it is determined that the count c2 is not equal to or greater than three ("NO" in step S206), the module processor 52 determines that the positioning accuracy is not acceptable (step S216). Subsequently, the process by the module processor 52 proceeds to step S221.

If it is determined that the presumed error range $\varepsilon$ is not less than the predetermined reference Rth ("NO" in step S204), the module processor 52 initializes the count c2 to "zero" (step S215). Subsequently, the process by the module processor 52 proceeds to step S216.

At step 221 after steps 207 or 216, the module processor 52 outputs the positioning results and the accuracy determination results (step S221). If the accuracy is determined to be NG, the module processor 52 may output "NG" data or an indication of no positioning data (for example, all of date and time and current position to be "zero") as a positioning result.

The module processor 52 determines whether an instruction has been obtained to terminate the positioning controlling operation (step S222). If it is determined that the termination instruction has not been obtained ("NO" in step S222), the process by the module processor 52 returns to step S202. If it is determined that the termination instruction has been obtained ("YES" in step S222), the module processor 52 performs predetermined operations regarding termination of positioning operations, such as sending an instruction to stop operations of the receiver 51, processing of obtained data, and the like (step S223). The module processor 52 then terminates the positioning control process.

As described above, the electronic timepiece 1 including the moving state determining device according to the present embodiment includes the receiver 51 receiving radiowaves from positioning satellites and the module processor 52. The module processor 52 determines its own moving state based on the motion state measured by sensor(s) of the sensor 64 for measuring its own motion state, and performs positioning operation based on the information received by the receiver 51 to obtain the current position and the presumed error range s of the current position. The moving state may be determined using the positioning result obtained when the presumed error range s satisfies the predetermined accuracy standard. The presumed error range s is calculated in consideration of the first estimated deviation $\Delta x$ and the second estimated deviation $\Delta p$. The first estimated deviation $\Delta x$ is obtained the position of each of a plurality of positioning satellites and the receiving state of the radiowaves received from the each of a plurality of positioning satellites. The second estimated deviation $\Delta p$ is a deviation of the calculated position pm with respect to the predicted position pf calculated according to the moving state of the electronic timepiece 1 (satellite radiowave receiving unit).

As described above, by using the sensor for the motion state measuremenr preferentially in determination of the moving state, it is possible to avoid determination of an unnatural moving state due to variation of current position by positioning error and to avoid frequent change between the moving state by vehicle and the static/stopped state. On the other hand, by using a positioning result only when its positioning accuracy is good enough to satisfy the predetermined accuracy standard, it is possible to more reliably determine a moving state which is difficult to detect with a sensor that measures a motion state, such as an acceleration sensor. In such cases, calculation of the presumed error range s becomes important. The electronic timepiece 1 according to this embodiment considers not only the distribution of positioning satellites (DOP) but also the strength of radiowaves received from each positioning satellite, and further performs a multidimensional evaluation using the predicted positions in calculating a presumed error range ε. This more reliably excludes the use of position measurement data with a large error, thereby suppresses erroneous determination and unnatural determination.

If a state regarding change in the obtained current position is different from a static/stopping state for a predetermined reference period (here, for three seconds) or more and if movement for a reference distance or more is detected (a state different from a state assumed from the current moving state), the module processor 52 determines to change the current state to a moving state by vehicle.

Thus, the effects of instantaneous or temporary errors or blurring are eliminated so that the current state transits to a moving state by vehicle when a movement is stably and clearly detected. As a result, in the electronic timepiece 1, it is possible to prevent rapid transition of a moving state in a short time and difficulty in using obtained results.

The sensor 64 includes an acceleration sensor 642. The module processor 52 determines whether the current state is a moving state on foot (walking or running) based on a predetermined acceleration variation pattern. If the current state is not a moving state on foot, the moving state is determined based on the motion state and the positioning result by the sensor 64.

When a user is walking or running, a specific acceleration variation pattern is measured for each step (or two steps) corresponding to the motion of the legs. Therefore, it is possible to easily determine the walking/running state without following the change in the rapid vibration acceleration. As a result, it is independently determined whether the current state is a walking/running state. If it is determined that the current state is not the walking/running state, that is, acceleration equal to or more than the reference value is not measured ("YES" in step S102) or acceleration equal to or more than the reference value is measured but the current state is not the walking/running state ("NO" in step S132), for example, a moving state is determined using data measured by the sensor 64 and the positioning result having high accuracy in combination as described above, if the positioning accuracy is good. Therefore, it is possible to perform an appropriate moving state determination with less blurring or unnatural judgment without increasing the processing load.

In the case where the presumed error range ε satisfies the predetermined accuracy standard and the moving velocity of the electronic timepiece 1 (the satellite radiowave receiving unit) is detectible, the module processor 52 determines the moving state based on the moving velocity. In this way, in the case where moving velocity of the satellite radiowave receiving unit can be obtained directly without obtaining displacement of the current position, the module processor 52 may use the moving velocity. As a result, it is possible to reduce the process for determination of the moving state. Alternatively, by using both of them in combination, it is possible to more reliably determine transition to a moving state by vehicle.

Furthermore, the electronic timepiece 1 as a moving state determination device includes a sensor 64. Thus, the electronic timepiece 1 itself includes the sensor 64, so that it is possible to easily and integrally determine the accurate moving state by the sensor 64 and the satellite radiowave receiving unit 50 which are integrally arranged.

The module processor 52 calculates the first estimated deviation Δx and the second estimated deviation Δp according to the deviation between the predicted position pf and the measured position pm, and calculates the presumed error range ε based on the first estimated deviation Δx and the second estimated deviation Δp. By considering a plurality of error factors, in particular, considering influences on the error of the receiving strength appropriately, it is possible to obtain a more appropriate value as the error range than before, and it is possible to avoid erroneous recognition based on an incorrect change in the current position. Therefore, in the electronic timepiece 1, it is possible to determine a moving state more accurately with less blurring.

The module processor 52 selects a larger one of the first estimated deviation Δx and the second estimated deviation Δp as a presumed error range ε. Such a simple process facilitates presumption of the largest error and prevents underestimation of deviation of positioning result, so that the positioning result can be used for determining the moving state only when it is expected to have the desired accuracy. Thus, in the electronic timepiece 1, it is possible to maintain determination of the moving state with little blurring.

The electronic timepiece 1 includes a ROM 63 (or a memory 53) storing ranging accuracy/SNR conversion data 632 which indicates a correspondence relation between the strength of radiowaves received from the positioning satellite (SNR) and the ranging accuracy $e_i$ of the positioning satellite corresponding to the strength of received radiowaves. The module processor 52 calculates the first estimation deviation Δx based on a combination of the relative position of a plurality of positioning satellites used for calculating the current position with respect to the current position and the ranging accuracy corresponding to the strength of radiowaves received from the plurality of positioning satellites.

As described above, the ranging accuracy $e_i$ of each positioning satellite is respectively used to calculate the first estimated deviation Δx based on the arrangement of the positioning satellites according to DOP, so that not only the arrangement of each positioning satellite but also the influence of the strength of received radiowaves from the plurality of positioning satellites are appropriately considered. Thus, it is possible to estimate the position with higher accuracy. Accordingly, in the electronic timepiece 1, the accuracy of the current position can be evaluated more accurately so that it is determined whether or not to use the current position for moving state determination.

The module processor 52 weights variations in relative positions of the positioning satellites using a ranging accuracy $e_i$ to calculate the first estimated deviation Δx. In the electronic timepiece 1, the ranging accuracy corresponding to the SNR of each positioning satellite is reflected to calculate the first estimated deviation Δx, as described above. This allows obtaining a quantitative error range according to the deviation of receiving intensity (SNR) from each positioning satellite more properly.

The module processor 52 calculates a moving velocity of the electronic timepiece 1 (the satellite radiowave receiving unit) based on the of the past positioning results and determines a position where the electronic timepiece 1 moves from the previously calculated position at the calculated moving velocity as a new predicted position pf. This allows the electronic timepiece 1 to quantitatively evaluate a presumed error range ε more properly based on the SNR and to determine the availability to the moving state determination.

The electronic timepiece 1 according to the present embodiment includes, in addition to the above-described configurations, the clock circuit 47 counting time and date, and the display 62 that can display time and date counted by the clock circuit 47.

Thus, it is possible to obtain information on a moving state without blurring more easily, even if it is affected not only by acceleration due to movement but also by motion or swinging of hands as in a portable electronic timepiece 1, particularly a wrist watch. In addition, because the moving state can be determined more appropriately, it is possible to perform the processing according to the moving state and switching of the processing more accurately in the electronic timepiece 1.

The moving state determining method according to the present embodiment further includes a determination step of determining its own moving state based on a measured motion state, and a positioning step of performing a positioning operation based on the information received by the receiver 51 to obtain the current position and an presumed error range ε of the current position. The positioning result is obtained if the presumed error range ε satisfies a predetermined accuracy standard, and can be used to determine the moving state. The presumed error range ε is calculated considering the first estimated deviation Δx and the second estimated deviation Δp, respectively. The first estimated deviation Δx is obtained by combining the position of each of a plurality of positioning satellites and the receiving state of the radiowaves received from each of the plurality of positioning satellites. The second estimated deviation Δp is a deviation of the obtained calculated position pm with respect to the predicted position pf calculated according to the moving state of the satellite radiowave receiving unit (the electronic timepiece 1).

As described above, only the positioning result having sufficiently high positioning accuracy is used for moving state determination, while suppressing unnaturally blurring determination and rapid change in determination caused by positional deviation due to positioning error. It is possible to prevent omitted determination and to maintain more accurate determination if the moving state is determined by using various sensors (in particular, a sensor worn on a user's arm and generating a large noise relative to the moving amount) which are capable of measuring the physical quantity regarding the motion state.

The programs 631 regarding the above-described position correction method are installed and executed in a computer. As a result, quantitative evaluation of errors can be performed more appropriately and easily, so that the moving state can be continually determined more accurately with little blurring in terms of software.

The present invention should not be limited to the above embodiment and various modifications can be made.

For example, in the moving state determination process of FIG. 5 according to the above embodiment, the determination result is quickly switched regarding the transition to a static state. Before step S133 after steps S105, S106, S123, and the like, if there is no change in current position for a predetermined time (three seconds etc.) counted in steps S107 and S108, the state can proceed to a static/stopped state. As a result, it is possible to further prevent unnatural change in a moving state due to variation in the positioning results. Similarly, in determining transition to a walking/running state, determination result may be controlled to be changed only when a new state has continued for a predetermined period.

Even in a moving state at a constant velocity, it may be determined that the moving state is a static/stopped state based on an uneven road surface, vibration accompanying the motor operation, or vibration of the bicycle to the left and right. In such cases, an acceleration state corresponding to a static/stopped state may be simply detected in the determination process of step S123, so that the process may proceed to step S133.

Further, in the above-described embodiment, if an acceleration equal to or more than a reference value is measured, the positioning result is not used in combination. However, even if acceleration equal to or more than a reference value is measured, the positioning result may be used in combination. For example, if it is determined in step S132 that the current state is not a walking/running state, the process may proceed to step S103 instead of step S121 so that the positioning result and the accuracy determination result are acquired.

Further, the moving state is determined using a change in the motion state detected by the acceleration sensor described in the above embodiment, but may be determined further using a change in altitude in combination, if the change in altitude can be detected by the atmospheric pressure sensor. For example, in the processing of steps S126 to S127 in FIG. 5, if a change in altitude equal to or more than a reference is detected in a unit of time (simply determined arbitrarily, for example, 1 second or 10 seconds), it is be determined that the static/stopped state transit to a moving state by vehicle. In addition, if the geomagnetic sensor 643 can detect generated magnetic field accompanying the movement of a train, whether or not the generated magnetic field is detected can be used in steps S123, S126, S127, and the like. Further, other sensors capable of obtaining a motion state may be used, such as an encoder for detecting rotation of a wheel or a gyro sensor for detecting rotational movement.

Further, in the above-described embodiment, the module processor 52 determines the motion state (moving state) based on the positioning result and the accuracy evaluation obtained by the satellite radio wave receiving unit 50 and the measurement data obtained from the sensor 64 via the host processor 41. However, the host processor 41 may obtain data respectively from the satellite radio wave receiving unit 50 and the sensor 64, to discriminate the motion state (moving state).

In the above embodiment, a larger one of the first estimated deviation Δx and the second estimated deviation Δp is determined to be the predetermined accuracy reference which is the presumed error range ε indicating a positioning accuracy (an error range), however, the average thereof may be used instead of mere use of a larger one. Alternatively, the average may be weighted in accordance with the motion state of the electronic timepiece 1 (satellite radiowave receiving unit 50), in accordance with a change in acceleration, in particular.

At least one of the two estimated deviations may be calculated by a method other than the one described above. For example, the predetermined accuracy reference value may be a value in the longitudinal direction of an error range (error ellipse) in the GST message format (Pseudorange Noise Statistics) in NMEA-0183, or a larger one of a standard deviation for latitude errors and a standard deviation for longitude errors acquired according to the error range. The method for estimating a predicted position for the second estimated deviation Δp may be different from that described for the above embodiment. In the estimation of a predicted position, the distribution of positioning satellites for the first estimated deviation Δx or the receiving strength may be considered. The error range in three axis directions may be calculated from offsets set for these directions, instead of the weighting in accordance with the strength of radiowaves received from each positioning satellite.

In the above embodiment, the moving state determining operation and the positioning controlling operation by the satellite radiowaves receiving unit 50 in the electronic timepiece 1 is described. Alternatively, the satellite radiowaves receiving unit 50 may be provided in various electronic devices other than the electronic timepiece 1. Alternatively, the satellite radiowaves receiving unit 50 may be a single module for receiving satellite radiowaves installed in the electronic device. Alternatively, the moving state determining device may be a single module for determining moving state or for positioning operation installed in the electronic device. In this case, the sensor 64 may be any sensor as long as a motion state of the module can be measured. For example, data of the sensor 64 may be obtained from the electronic device provided with the positioning module and the sensor 64. Furthermore, radiowaves may be received from any positioning satellites. Radiowaves from positioning satellites in several satellite positioning systems or those from regional positioning satellites, which supplement the functions of the global positioning systems, may be present at the same time.

In the above description, the programs 631 for controlling the receipt of radiowaves from positioning satellites according to the present invention at the time of acquisition of current date and time information are stored in a computer-readable recording medium, such as a nonvolatile memory, including a flash memory, and the ROM 63, including a mask ROM, though not limitative in any way. Any other type of computer-redable recording medium may be used, for example, a portable recording medium, such as hard disk drive (HDD), CD-ROM, and DVD disk. The present invention is also applicable to carrier waves, a medium which provides the programs according to the present invention with data via a communication line.

It should be understood that the details of the configurations, control procedures, and display examples shown in the above embodiment can be appropriately modified without departing from the scope of the present invention.

The embodiments described above should not be construed to limit the present invention, and the claims and other equivalents thereof are included in the scope of the invention.

The invention claimed is:

1. A moving state determining device comprising:
a receiver for receiving radiowaves from a plurality of positioning satellites; and
a processor, being configured to:
determine a moving state of a satellite radiowave receiving unit based on a motion state measured by a sensor,
perform a positioning operation based on information received by the receiver to obtain a current position,
obtain a positioning accuracy based on strengths of radiowaves received from the plurality of positioning satellites, respectively, and distribution of the plurality of positioning satellites,
obtain a deviation of the current position relative to a predicted position calculated according to a previous moving state of the satellite radiowave receiving unit,
calculate an error range based on both the positioning accuracy and the deviation of the current position relative to the predicted position, and
obtain a result of the positioning operation when the error range satisfies a predetermined accuracy standard and use the result in determining a subsequent moving state of the satellite radiowave receiving unit.

2. The moving state determining device according to claim 1, wherein, if a state regarding change in an obtained current position is different from a state assumed from a current moving state for a predetermined reference period or more, the processor changes a determination result of a moving state.

3. The moving state determining device according to claim 1,
wherein the sensor includes an acceleration sensor, and
wherein the processor determines a moving state on foot based on a predetermined acceleration variation pattern, and
wherein, if the moving state is not determined to be a moving state on foot, the moving state is determined based on the motion state and the result of the positioning operation.

4. The moving state determining device according to claim 2,
wherein the sensor includes an acceleration sensor, and
wherein the processor determines a moving state on foot based on a predetermined acceleration variation pattern, and
wherein, if the moving state is not determined to be a moving state on foot, the moving state is determined based on the motion state and the result of the positioning operation.

5. The moving state determining device according to claim 1, wherein, if the error range satisfies the predetermined accuracy standard and a moving velocity of the satellite radiowave receiving device is detectable, the processor determines the moving state based on the moving velocity.

6. The moving state determining device according to claim 1, comprising the sensor.

7. The moving state determining device according to claim 1, wherein the processor calculates a first error range for the positioning accuracy and a second error range for the deviation of the predicted position and the current position, to calculate the error range of the current position based on the first error range and the second error range.

8. The moving state determining device according to claim 7, wherein the processor determines a larger one of the first error range and the second error range as the error range of the current position.

9. The moving state determining device according to claim 7, further comprising a memory storing a correspondence relation between strength of radiowaves received from a positioning satellite and a ranging accuracy of the positioning satellite in accordance with the strength of the radiowaves received from the positioning satellite,
wherein the processor calculates the first error range based on a combination of a relative position relative to the current position of each of the plurality of positioning satellites used for calculating current position and the ranging accuracy in accordance with strength of radiowaves received from each of the plurality of positioning satellites.

10. The moving state determining device according to claim 8, further comprising a memory storing a correspondence relation between strength of radiowaves received from a positioning satellite and a ranging accuracy of the positioning satellite in accordance with the strength of the radiowaves received from the positioning satellite, wherein the processor calculates the first error range based on a combination of a relative position relative to the current position of each of the plurality of positioning satellites used for calculating current position and the ranging accuracy in accordance with strength of radiowaves received from each of the plurality of positioning satellites.

11. The moving state determining device according to claim 9,
wherein the processor weights variations in relative positions of the plurality of positioning satellites with respect to the current position using the ranging accuracy and calculates the first error range.

12. The moving state determining device according to claim 10,
wherein the processor weights variations in relative positions of the plurality of positioning satellites with respect to the current position using the ranging accuracy and calculates the first error range.

13. The moving state determining device according to claim 7,
wherein the processor calculates a moving velocity of the satellite radiowave receiving device based on a result of past positioning operation, and calculates a new predicted position which is a position of the satellite radiowave receiving device moving at the moving velocity from a previously calculated position.

14. The moving state determining device according to claim 8,
wherein the processor calculates a moving velocity of the satellite radiowave receiving device based on a result of past positioning operation, and calculates a new predicted position which is a position of the satellite radiowave receiving device moving at the moving velocity from a previously calculated position.

15. The moving state determining device according to claim 9,
wherein the processor calculates a moving velocity of the satellite radiowave receiving device based on a result of past positioning operation, and calculates a new predicted position which is a position of the satellite radiowave receiving device moving at the moving velocity from a previously calculated position.

16. The moving state determining device according to claim 10,
wherein the processor calculates a moving velocity of the satellite radiowave receiving device based on a result of past positioning operation, and calculates a new predicted position which is a position of the satellite radiowave receiving device moving at the moving velocity from a previously calculated position.

17. The moving state determining device according to claim 11,
wherein the processor calculates a moving velocity of the satellite radiowave receiving device based on a result of past positioning operation, and calculates a new predicted position which is a position of the satellite radiowave receiving device moving at the moving velocity from a previously calculated position.

18. An electronic timepiece comprising:
the moving state determining device according to claim 1;
the sensor,
a clock circuit counting date and time; and
a display displaying the date and time counted by the clock circuit.

19. A moving state determining method using a receiver for receiving radiowaves from a plurality of positioning satellites, comprising:
determining a moving state of a satellite radiowave receiving unit based on a motion state measured by a sensor;
performing a positioning operation based on information received by the receiver to obtain a current position;
obtaining a positioning accuracy based on strengths of radiowaves received from the plurality of positioning satellites, respectively, and distribution of the plurality of positioning satellites;
obtaining a deviation of the current position relative to a predicted position calculated according to a previous moving state of the satellite radiowave receiving unit;
calculating an error range based on both the positioning accuracy and the deviation of the current position relative to the predicted position; and
obtaining a result of the positioning operation when the error range satisfies a predetermined accuracy standard and use the result in determining a subsequent moving state of the satellite radiowave receiving unit.

20. A non-transitory computer readable storage device storing a program readable by a computer comprising a receiver for receiving radiowaves from a plurality of positioning satellites, the program causing the computer to:
determine a moving state of a satellite radiowave receiving unit based on a motion state measured by a sensor;
perform a positioning operation based on information received by the receiver to obtain a current position;
obtain a positioning accuracy based on strengths of radiowaves received from the plurality of positioning satellites, respectively, and distribution of the plurality of positioning satellites;
obtain a deviation of the current position relative to a predicted position calculated according to a previous moving state of the satellite radiowave receiving unit;
calculate an error range based on both the positioning accuracy and the deviation of the current position relative to the predicted position; and
obtain a result of the positioning operation when the error range satisfies a predetermined accuracy standard and use the result in determining a subsequent moving state of the satellite radiowave receiving unit.

* * * * *